(12) United States Patent
Sakurada

(10) Patent No.: US 11,386,440 B2
(45) Date of Patent: Jul. 12, 2022

(54) DEVICE AND METHOD FOR MANAGEMENT OF SHARED VEHICLES

(71) Applicant: TOYOTA JIDOSHA KABUSHIKI KAISHA, Toyota (JP)

(72) Inventor: Shin Sakurada, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 664 days.

(21) Appl. No.: 16/261,669

(22) Filed: Jan. 30, 2019

(65) Prior Publication Data
US 2019/0266623 A1    Aug. 29, 2019

(30) Foreign Application Priority Data

Feb. 23, 2018 (JP) .............................. JP2018-030955

(51) Int. Cl.
| | |
|---|---|
| *G06Q 30/02* | (2012.01) |
| *G06Q 50/30* | (2012.01) |
| *G06N 5/04* | (2006.01) |
| *G06N 20/00* | (2019.01) |

(52) U.S. Cl.
CPC ........... *G06Q 30/0203* (2013.01); *G06N 5/04* (2013.01); *G06N 20/00* (2019.01); *G06Q 50/30* (2013.01)

(58) Field of Classification Search
CPC .............. G06Q 30/0203; G06Q 50/30; G06Q 10/06315; G06Q 30/0202; G06Q 30/0201; G06Q 50/10; G06N 5/04; G06N 20/00; G08G 1/20

USPC .......................................................... 705/13
See application file for complete search history.

(56) References Cited

U.S. PATENT DOCUMENTS

2015/0310744 A1* 10/2015 Farrelly ................. G08G 1/005
                                                                340/932.2
2016/0247327 A1    8/2016 Kozawa et al.

FOREIGN PATENT DOCUMENTS

| JP | 2008000417 A | * | 1/2008 |
|---|---|---|---|
| JP | 2016-200983 | | 12/2016 |
| JP | 2017-010189 | | 1/2017 |
| WO | WO 2015/050242 A1 | | 4/2015 |

OTHER PUBLICATIONS

Milos Balac, Carsharing Demand Estimation, 2015 (Year: 2015).*

* cited by examiner

*Primary Examiner* — Tarek Elchanti
(74) *Attorney, Agent, or Firm* — Oblon, McClelland, Maier & Neustadt, L.L.P.

(57) ABSTRACT

A shared vehicle management device manages shared vehicles located in an area where a user is present. The area includes multiple zones differing from one another, and each of the zones includes one or more parking lots. The shared vehicle management device includes a controller configured to prompt the user to select a zone including a parking lot where the user will start use of a shared vehicle or return the shared vehicle, a use history acquisition unit, a demand calculator, a supply calculator, and a zone setting unit configured to determine the parking lots included in each zone so as to minimize a value obtained by adding differences between the demand for shared vehicles and the supply of shared vehicles in each zone included in the area.

6 Claims, 5 Drawing Sheets

DEVICE AND METHOD FOR MANAGEMENT OF SHARED VEHICLES

BACKGROUND

1. Field

The following description relates to a shared vehicle management device that manages shared vehicles used by multiple users and a method for managing the shared vehicles.

2. Description of Related Art

Japanese Laid-Open Patent Publication No. 2016-200983 describes an example of a shared vehicle management device that presents a candidate parking lot to a user who will use a shared vehicle located in an area including multiple parking lots. The device gives priority to a parking lot having a low turnover rate over a parking lot having a high turnover rate to promote even use of the shared vehicles between the parking lots.

The above shared vehicle management device determines the candidate parking lot, which is presented to a user, based on the turnover rate of each parking lot. In this case, the presented parking lot may not be desirable to the user. In this regard, there is still room for improvement in user convenience.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One object is to provide a shared vehicle management device and a method for managing shared vehicles that promote even use of the shared vehicles while improving user convenience.

One embodiment provides a shared vehicle management device for managing shared vehicles located in an area where a user is present. The area includes multiple zones differing from one another, and each of the zones includes one or more parking lots. The shared vehicle management device includes a controller, a use history acquisition unit, a demand calculator, a supply calculator, and a zone setting unit. The controller is configured to prompt the user to select, from the multiple zones, a zone that includes a parking lot where the user will start use of a shared vehicle or a parking lot where the user will return the shared vehicle. The use history acquisition unit is configured to acquire data of starting points of use of the shared vehicles as use history of the shared vehicles. The demand calculator is configured to calculate the demand for the shared vehicles in each zone based on the use history of the shared vehicles acquired by the use history acquisition unit. The supply calculator is configured to calculate the supply of the shared vehicles in each zone based on the number of the shared vehicles parked in each parking lot. The zone setting unit is configured to determine the parking lots included in each zone so as to minimize a value obtained by adding the differences between the demand for the shared vehicles in each zone included in the area calculated with the demand calculator and the supply of the shared vehicles in each zone included in the area calculated with the supply calculator.

One embodiment provides a method for managing shared vehicles that are located in an area where a user is present. The area includes multiple zones differing from one another, and each of the zones includes one or more parking lots. The method for managing shared vehicles includes prompting the user to select, from the multiple zones, a zone that includes a parking lot where the user will start use of a shared vehicle or a parking lot where the user will return the shared vehicle. The method for managing shared vehicles further includes acquiring data of starting points of use of the shared vehicles as use history of the shared vehicles, calculating the demand for the shared vehicles in each zone based on the acquired use history of the shared vehicles, calculating the supply of the shared vehicles in each zone based on the number of the shared vehicles parked in each parking lot, determining the parking lots included in each zone so as to minimize a value obtained by adding the differences between the demand for the shared vehicles calculated for each zone included in the area and the supply of the shared vehicles calculated for each zone included in the area.

One embodiment provides a shared vehicle management device for managing shared vehicles located in an area where a user is present. The area includes multiple zones differing from one another, and each of the zones includes one or more parking lots. The shared vehicle management device includes circuitry. The circuitry is configured to prompt the user to select, from the multiple zones, a zone that includes a parking lot where the user will start use of a shared vehicle or a parking lot where the user will return the shared vehicle. The circuitry is further configured to acquire data of starting points of use of the shared vehicles as use history of the shared vehicles, calculate the demand for the shared vehicles in each zone based on the acquired use history of the shared vehicles, calculate the supply of the shared vehicles in each zone based on the number of the shared vehicles parked in each parking lot, and determine the parking lots included in each zone so as to minimize a value obtained by adding the differences between the demand for the shared vehicles calculated for each zone included in the area and the supply of the shared vehicles calculated for each zone included in the area.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

A shared vehicle management device in accordance with one embodiment will now be described with reference to the drawings.

The shared vehicle management device in accordance with the present embodiment is configured by a center that manages driving information of multiple shared vehicles. An area where a user is present includes multiple zones, and each zone includes one or more parking lots. From the one or more parking lots included in a zone, the center selects a parking lot where the user will start use of a shared vehicle or return a shared vehicle. In this case, the center prompts the user to select a zone that includes a parking lot where the user will start use of a shared vehicle or return a shared vehicle. In other words, instead of selecting a parking lot, the user selects a zone that includes a parking lot where the user will start use of a shared vehicle or return a shared vehicle.

Figure 1:
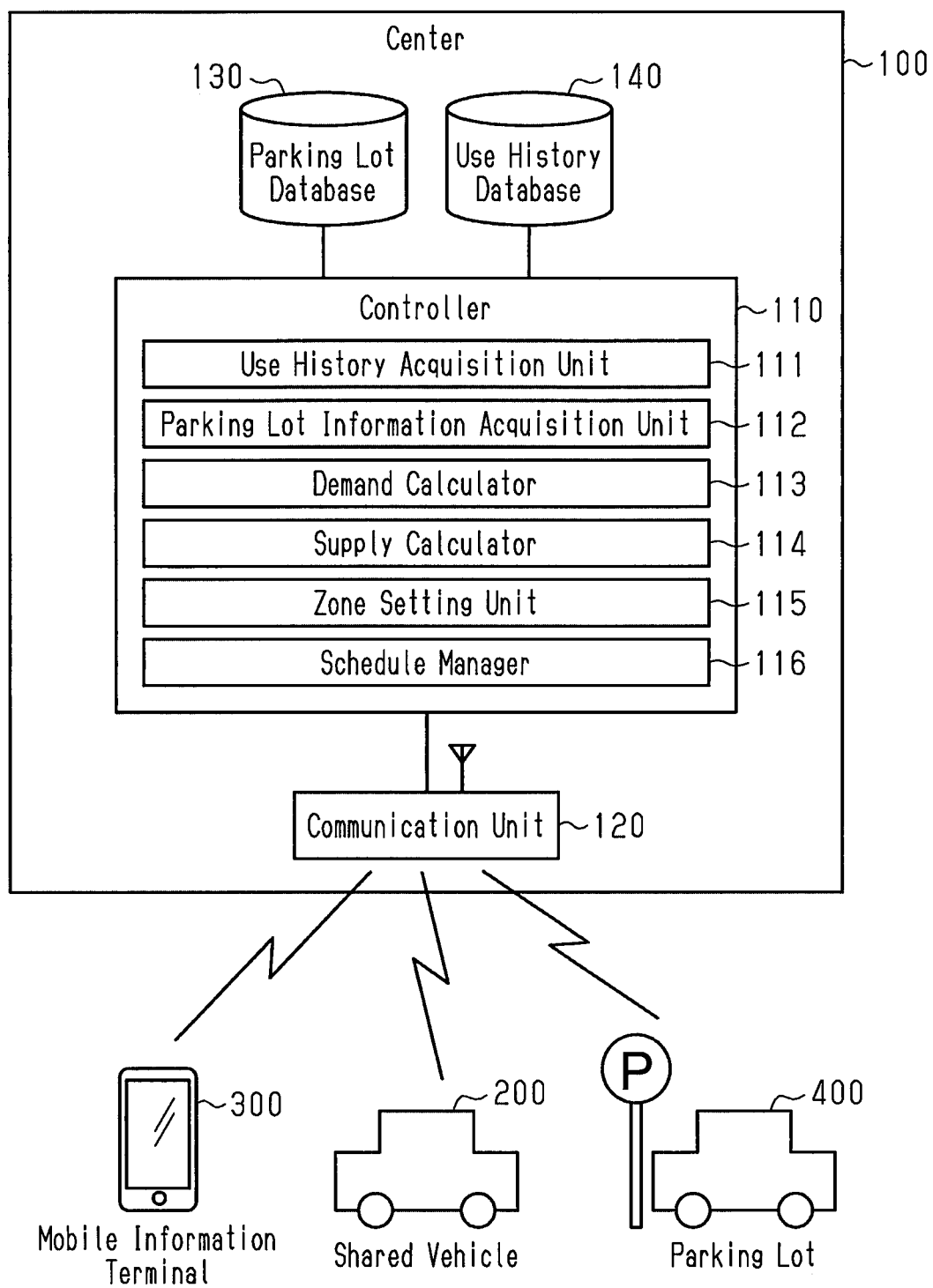
FIG. 1 is a schematic block diagram showing the configuration of a shared vehicle management device in accordance with one embodiment.

Specifically, as shown in FIG. 1, a center 100 includes a controller 110, a communication unit 120, a parking lot database 130, and a use history database 140. The controller 110 can be circuitry that includes 1) at least one processor running on a computer program (software), 2) at least one exclusive hardware circuit such as an application specific integrated circuit (ASIC) to execute at least part of a process, or 3) a combination of the above. A processor includes a CPU and a memory such as a RAM and a ROM. The memory stores program codes or commands that are configured to have the CPU execute processes. The memory, which is a computer readable medium, may be any available medium that is accessible by a versatile or a dedicated computer.

The controller 110 manages the use status of shared vehicles 200. More specifically, the controller 110 includes a use history acquisition unit 111, a parking lot information acquisition unit 112, a demand calculator 113, a supply calculator 114, a zone setting unit, and a schedule manager 116.

The use history acquisition unit 111 receives an application for use of a shared vehicle 200 from a mobile information terminal 300 via the communication unit 120. In response to the application for use of the shared vehicle 200, a parking lot that is a starting point of use of the shared vehicle 200 is designated. The use history acquisition unit 111 accumulates data of the designated starting points of use as use history of the shared vehicles 200 in the use history database 140.

The parking lot information acquisition unit 112 receives the number of the shared vehicles 200 parked in each parking lot via the communication unit 120 from a management device that is located at each parking lot 400. Subsequently, the parking lot information acquisition unit 112 updates the data of use status of the parking lots that is stored in the parking lot database 130 based on the received number of parked shared vehicles 200.

The demand calculator 113 calculates the demand for the shared vehicles 200 at each parking lot based on the use history of the shared vehicles 200 accumulated in the use history database 140. More specifically, the demand calculator 113 calculates the demand for the shared vehicles 200 at a parking lot based on a value that is a cumulative number of occasions when users designated the parking lot as the starting points of use of the shared vehicles 200. A parking lot that is relatively frequently designated as the starting points of use of the shared vehicles 200 is a parking lot with a relatively high demand for the shared vehicles 200.

The supply calculator 114 calculates the supply of the shared vehicles 200 in a parking lot based on the number of the shared vehicles 200 parked in the parking lot that is stored in the parking lot database 130. A parking lot with a relatively large number of parked shared vehicles 200 is a parking lot with a relatively high supply of the shared vehicles 200.

Figure 2:
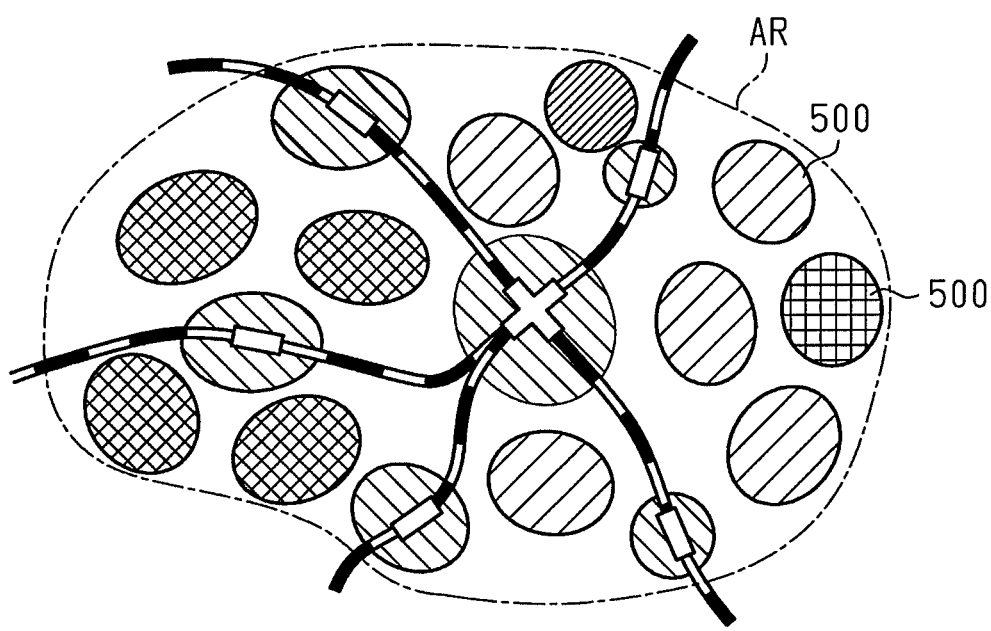
FIG. 2 is a schematic diagram showing one example of an area including multiple zones.

The zone setting unit 115 obtains the difference between the demand for the shared vehicles 200 calculated with the demand calculator 113 and the supply of the shared vehicles calculated with the supply calculator 114 for each parking lot and compiles the differences for each zone that includes one or more parking lots. Accordingly, the difference between a total demand for the shared vehicles in parking lots included in a zone and a total supply of the shared vehicles in the parking lots included in the zone is obtained for each zone. FIG. 2 shows an example in which characteristics information that indicates characteristics of a zone is given to each zone 500 in an area AR where a user is present. The characteristics information is associated with each parking lot and registered in advance in a map database. The characteristics information of each zone is defined based on a ratio of the characteristics information of multiple parking lots included in a zone. For example, when a zone includes more parking lots associated with the characteristics information of "residential" than parking lots associated with the characteristics information of "business", the characteristics information of "residential" is added to the zone. Further, the zone setting unit 115 determines the parking lots included in each zone 500 so as to minimize the sum of the differences between the demand and supply of the shared vehicles in each zone 500 included in the area AR. The sum of the differences between the demand and supply of the shared vehicles in each zone 500 included in the area AR may refer to, for example, a square of the difference between the demand and supply of the shared vehicles in zone A+a square of the difference between the demand and supply of the shared vehicles in zone B+ . . . . Alternatively, it may refer to an absolute value of the difference between the demand and supply of the shared vehicles in zone A+an absolute value of the difference between the demand and supply of the shared vehicles in zone B+ . . . .

The schedule manager 116 manages the schedule for adding and canceling parking lots based on the demand for the shared vehicles 200 at each parking lot calculated with the demand calculator 113.

With reference to the drawings, the flow of processes performed when a user applies for use of the shared vehicle 200 by operating the mobile information terminal 300 will now be described.

Figure 3A:
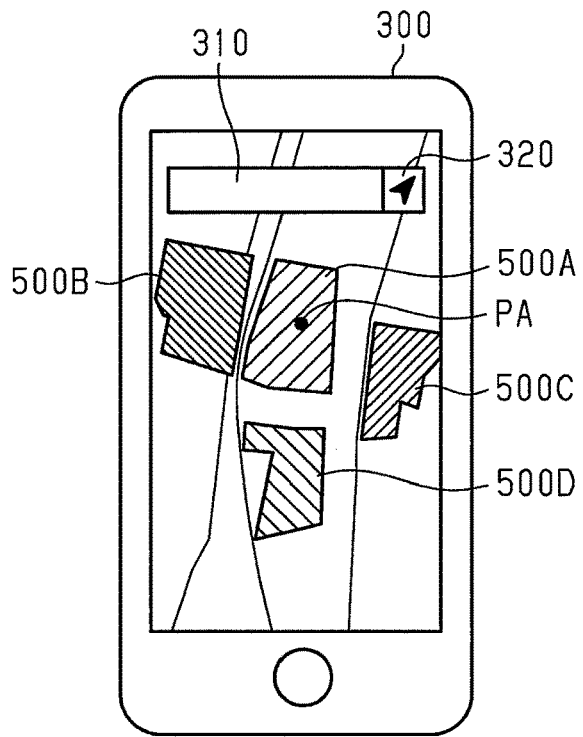
FIGS. 3A to 3D are schematic diagrams showing examples of the transition of a display screen on a mobile information terminal when applying for use of a shared vehicle.

As shown in FIG. 3A, a search box 310 and an icon 320 are displayed next to each other in the upper part of a display screen of the mobile information terminal 300. A user first touches and operates the icon 320 to designate a displayed area of map data on the mobile information terminal 300 using the current location of the user PA as a reference. In the example shown in FIG. 3A, the display screen displays an area of the map data having multiple zones 500A to 500D including the zone 500A in which the user PA is currently present.

Figure 3B:
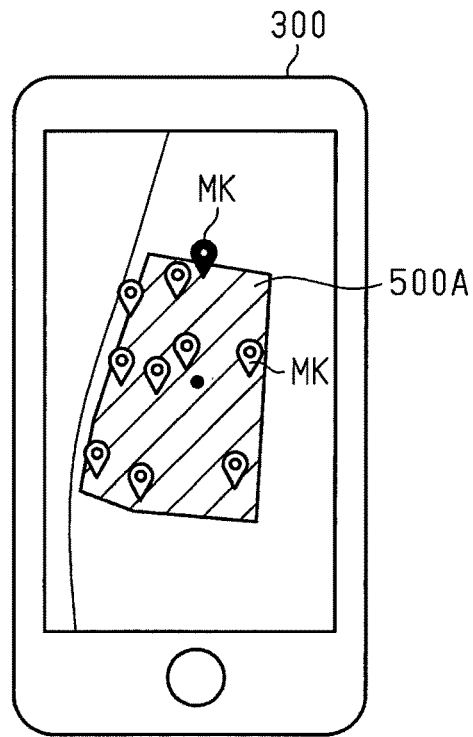

As shown in FIG. 3B, when the user selects the zone 500A, the selected zone 500A is enlarged. Multiple marks MK are displayed in the enlarged zone 500A indicating locations of parking lots in the zone 500A. Then, the demand and supply for the shared vehicles 200 are calculated for each parking lot included in the zone 500A. The parking lot that has the largest difference obtained by subtracting the demand from the supply is selected or designated as a parking lot where the user will start use of the shared vehicle 200. In the example shown in FIG. 3B, the mark MK that indicates the parking lot where the user will start use of the shared vehicle 200 is colored and distinguished from the other marks MK. More specifically, when the user selects the zone 500A, which is included in the displayed area of map data, the parking lot with the highest relative value of the supply to the demand for the shared vehicles 200 among the parking lots in the selected zone 500A is automatically selected as a parking lot where the user will start use of the shared vehicle 200. In this manner, a single parking lot is automatically selected from multiple parking lots in the selected zone as a parking lot where the user will start use of the shared vehicle 200 based on the demand and supply of the shared vehicles 200 in each parking lot included in the zone selected by the user.

Figure 3C:
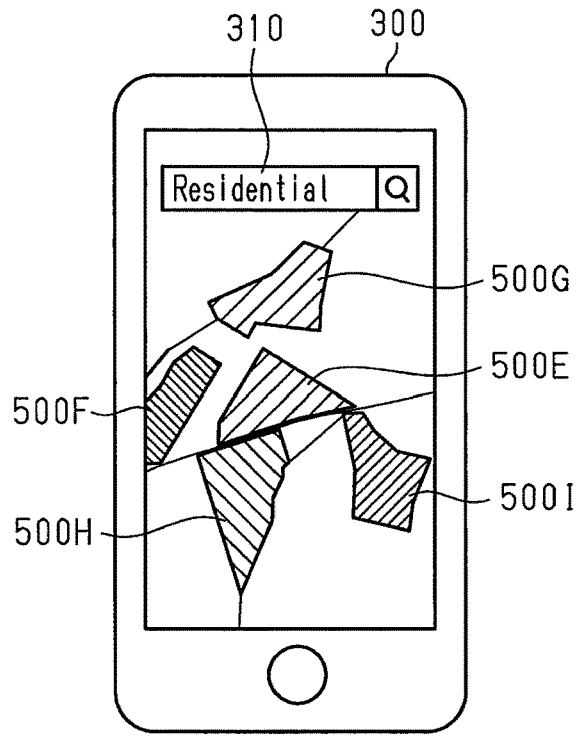

As shown in FIG. 3C, a user inputs a keyword in the search box 310 to search for a parking lot where the user will end use of the shared vehicle 200. In the example shown in FIG. 3C, the user inputs the keyword of "residential" in the search box 310. Subsequently, the characteristics information of the zones included in the area where the user is present is queried based on the input keyword so that the displayed area of the map data includes zones that correspond to the input keyword. In FIG. 3C, the displayed area of the map data includes zones 500E to 500I that have the characteristics information of "residential".

Figure 3D:
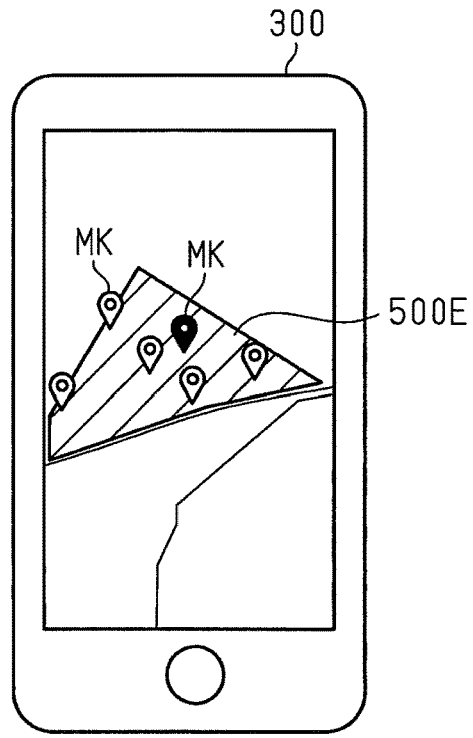

As shown in FIG. 3D, when the user selects the zone 500E, the selected zone 500E is enlarged. In the same manner as the zone 500A shown in FIG. 3B, the multiple marks MK are displayed in the enlarged zone 500E indicating locations of parking lots in the zone 500E. Then, the demand and supply of the shared vehicles 200 at each parking lot included in the zone 500E are calculated. The parking lot that has the largest difference obtained by subtracting the demand from the supply of the shared vehicles 200 is selected or designated as a parking lot where the user will end use of the shared vehicle 200. In the example shown in FIG. 3D, the mark MK that indicates the parking lot where the user will end use of the shared vehicle 200 is colored and distinguished from the other marks MK. More specifically, when the user selects the zone 500E, which is included in the displayed area of map data, the parking lot with the highest relative value of the demand to the supply of the shared vehicles 200 in the parking lots included in the selected zone 500E is automatically selected as a parking lot where the user will end use of the shared vehicle 200. In this manner, a single parking lot is automatically selected from multiple parking lots in the selected zone as a parking lot where the user will end use of the shared vehicle 200 based on the demand and supply of the shared vehicles 200 in each parking lot included in the zone selected by the user.

A process for setting zones based on the demand and supply of the shared vehicles 200 in parking lots will now be described with reference to the drawings.

Figure 4B:
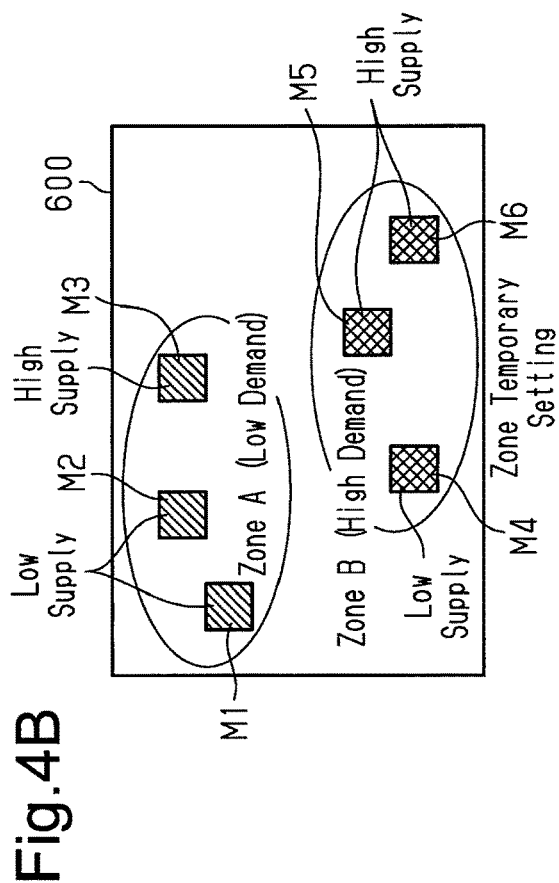
FIGS. 4A to 4C are schematic diagrams illustrating the flow of processes for setting parking lots in each zone.
Figure 4A:
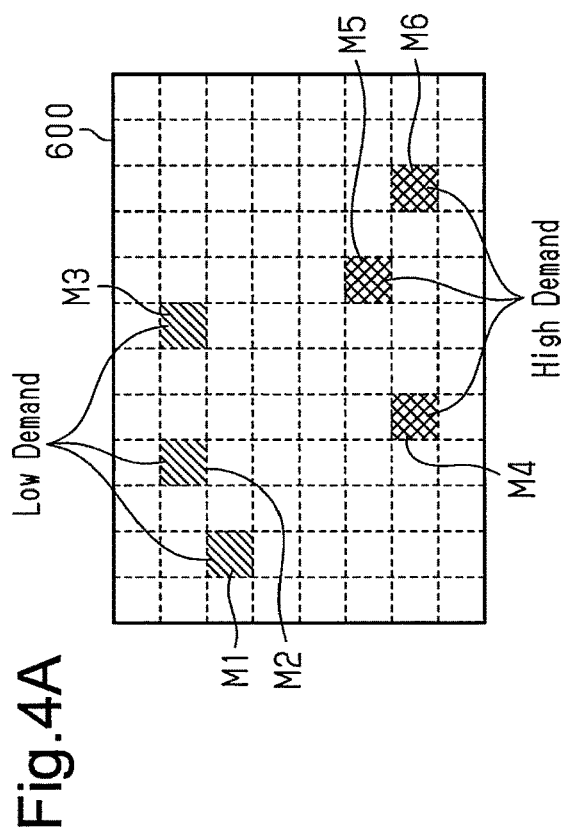

As shown in FIG. 4A, the center 100 divides a map data 600 into grids and sums the number of occasions in which the center 100 received information related to the starting points of use of the shared vehicles 200 from the mobile information terminals 300 for each grid M corresponding to the starting point of use. When the sum of a grid M is greater than or equal to a predetermined threshold, the center 100 determines the location corresponding to the grid M as a location of a parking lot. Further, the center 100 calculates the demand for the shared vehicles 200 in each parking lot in accordance with the sum of the corresponding grid M. More specifically, the center 100 calculates a larger demand for the shared vehicles 200 in a parking lot as the sum of the corresponding grid M increases. In the example shown in FIG. 4A, grids M1 to M3, which correspond to parking lots with a relatively low sum and thereby have a low demand for the shared vehicles 200, are concentrated in an upper region of the map data 600. Further, in FIG. 4A, grids M4 to M6, which correspond to parking lots with a relatively high sum and thereby have a high demand for the shared vehicles 200, are concentrated in a lower region of the map data 600.

In the example shown in FIG. 4B, "zone A" includes parking lots corresponding to the grids M1 to M3, that is, a combination of parking lots with a low demand for the shared vehicles 200. Further, "zone B" includes parking lots corresponding to the grids M4 to M6, that is, a combination of parking lots with a high demand for the shared vehicles 200.

Further, the center 100 receives the number of the shared vehicles 200 that are parked from a management device located in each parking lot included in each zone. The center 100 calculates the supply of the shared vehicles 200 based on the number of the shared vehicles 200 parked in each parking lot. In the example shown in FIG. 4B, some of the parking lots in "zone A" have a relatively low supply of the shared vehicles 200 and the remaining parking lots included in "zone A" have a relatively high supply of the shared vehicles 200. That is, "zone A" includes parking lots with excess supply relative to the demand for the shared vehicles 200.

In contrast, part of the parking lots included in "zone B" have a relatively high supply of the shared vehicles 200 and the remaining parking lots included in "zone B" have a relatively low supply of the shared vehicles 200. That is, "zone B" includes parking lots with an insufficient supply relative to the demand for the shared vehicles 200.

Figure 4C:
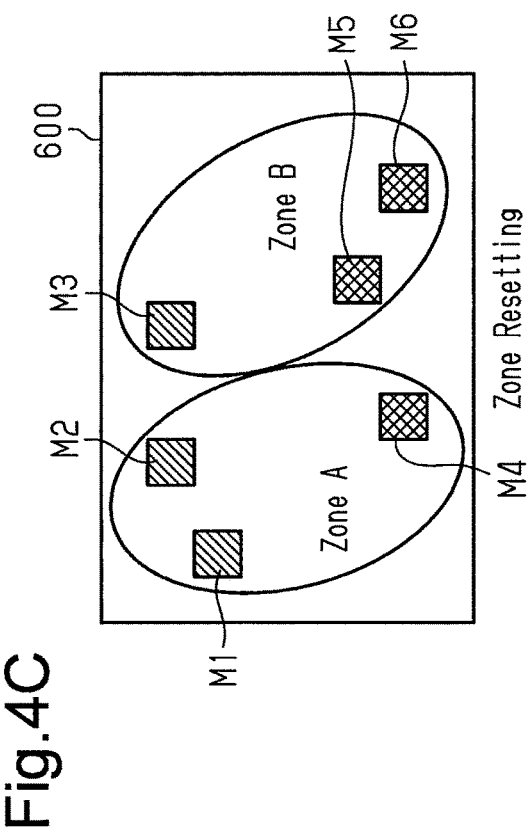

In this respect, as shown in FIG. 4C, in the present embodiment, the center 100 switches the parking lot having an unbalanced supply and demand of the shared vehicles 200 in "zone A" with the parking lot having an unbalanced supply and demand of the shared vehicles 200 in "zone B." The center 100 reconfigures the zones 500 by changing parking lots included in the zones 500. More specifically, "zone A," which has a low demand for the shared vehicles 200, is reconfigured to include parking lots having a low supply of the shared vehicles 200. In the same manner, "zone B," which has a high demand for the shared vehicles 200, is reconfigured to include parking lots having a high supply of the shared vehicles 200. Accordingly, the supply and demand for the shared vehicles 200 in each zone 500 are well-balanced.

When reconfiguring the zones 500, the center 100 sets a size limit for each zone 500. More specifically, when changing the parking lots included in the zones 500, the center 100 sets candidate parking lots to be changed so as to satisfy the limitation condition on the size of the zones 500.

A process when a user reserves the shared vehicle 200 by operating the mobile information terminal 300 will now be described with reference to the drawings.

Figure 5:
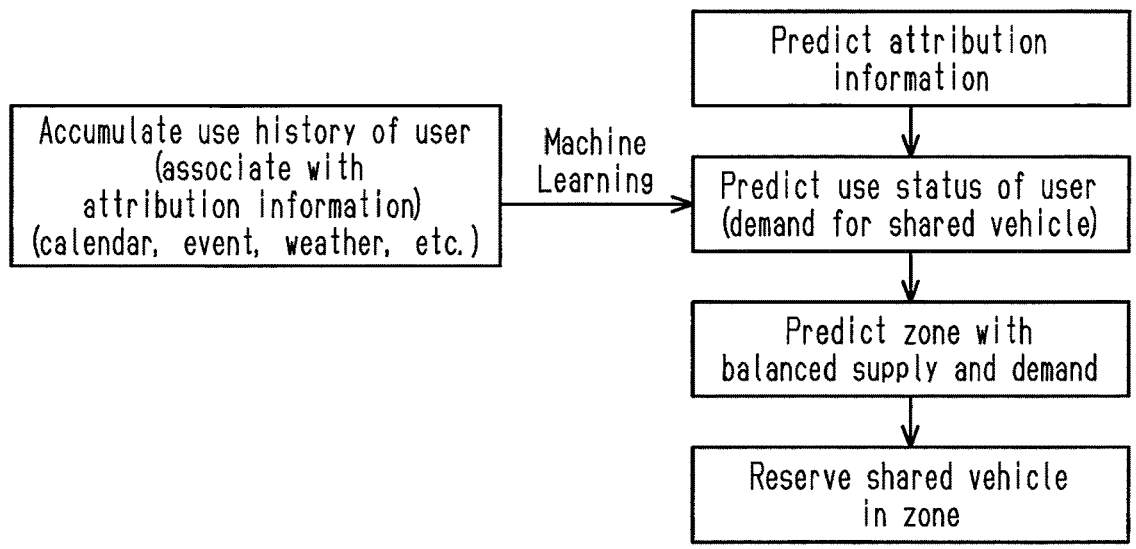
FIG. 5 is a schematic diagram illustrating the flow of processes for reserving a shared vehicle.

As shown in FIG. 5, the center 100 first accepts an application for use of the shared vehicle 200 from the mobile information terminal 300 via the communication unit 120. Subsequently, the center 100 accumulates data of the starting point of use of the shared vehicle 200, which is designated upon the application for use, as the use history of the shared vehicles 200 in the use history database 140. In this case, the center 100 associates attribution information, which influences the use of the shared vehicles 200, with the use history of the shared vehicles 200 to accumulate in the use history database 140. Examples of the attribution information include a calendar indicating the dates the shared vehicles 200 are used, whether or not the dates include an event, and the weather information.

Further, the center 100 generates training data by associating the attribution information with the use history of the shared vehicles 200 and stores the training data in a storage. The center 100 undergoes machine learning using the training data to learn a function indicating the relationship between the demand for the shared vehicles 200 and the attribution information for each parking lot.

Then, the center 100 inputs prediction data of the attribution information for when the user will use the shared vehicle 200 to the function the center 100 has learned in order to predict the demand for the shared vehicles 200 in the parking lots. When the prediction data of the attribution information is the weather information, the weather information can be obtained from a weather information server that forecasts the weather.

Subsequently, the center 100 obtains the difference between the demand and supply of the shared vehicles 200 in each parking lot based on the predicted demand for the shared vehicles 200 in each parking lot. Then, the center 100 determines the parking lots that are to be included in each zone to minimize the value obtained by adding the differences in the zones 500 included in the area AR. In this way, multiple zones are set in an area, and the zones each have well-balanced demand and supply of the shared vehicles 200.

Consequently, the center 100 transmits information related to the zones configured based on the predicted demand for the shared vehicles 200 to the mobile information terminal 300. The user operates the mobile information terminal 300 to designate a parking lot to start use of a shared vehicle 200 or return the shared vehicle 200 and reserve the shared vehicle 200. That is, when the user selects a zone, the center 100 selects a parking lot from the parking lots included in the zone selected by the user.

With reference to the drawings, a process for managing a schedule for adding and canceling parking lots based on the demand for the shared vehicles 200 in each parking lot in accordance with the present embodiment will now be described.

Figure 6:
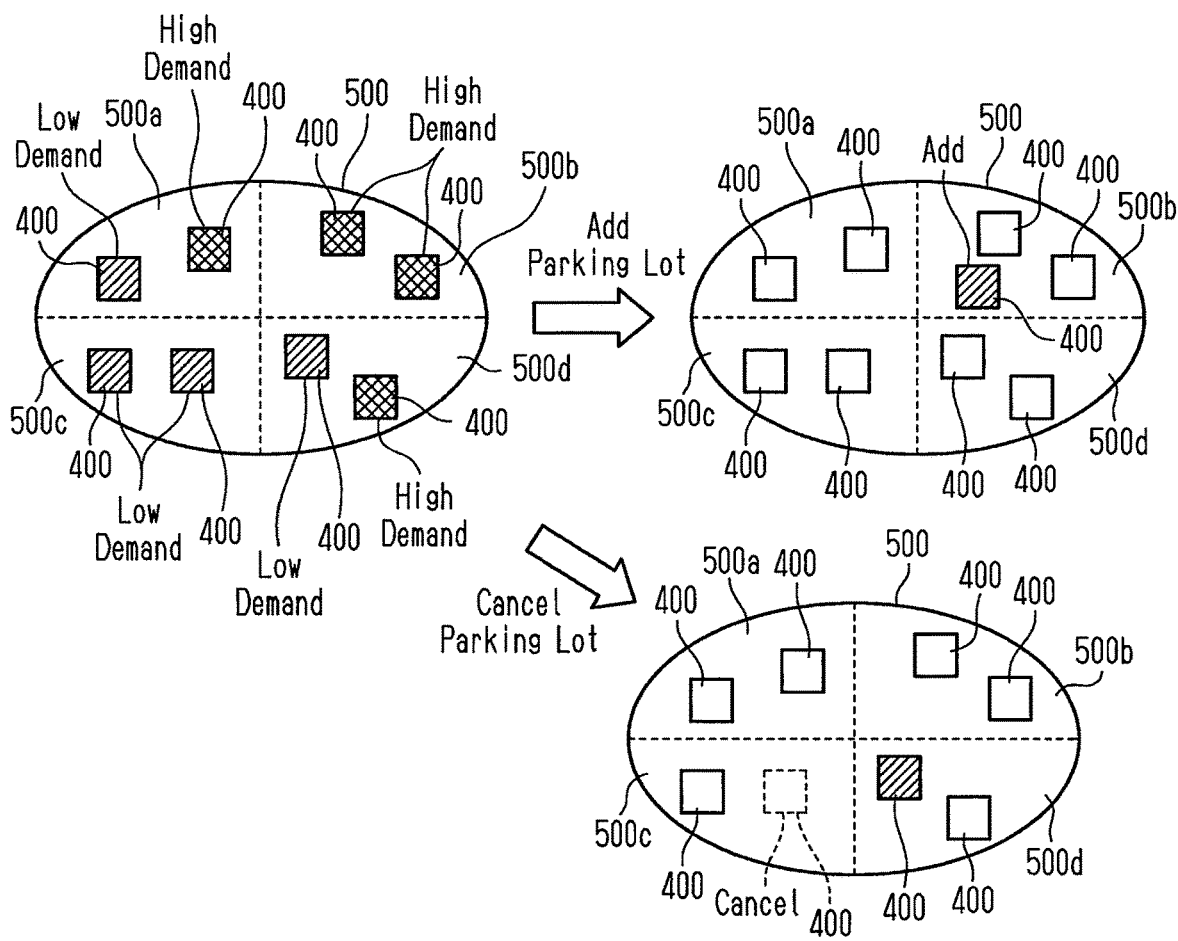
FIG. 6 is a schematic diagram illustrating the flow of processes for managing a schedule for adding and canceling a parking lot.

As shown in FIG. 6, the center 100 first divides the zone 500 including multiple parking lots 400 into multiple regions 500a to 500d. In the example shown in FIG. 6, the zone 500 is divided into a first region 500a, a second region 500b, a third region 500c, and a fourth region 500d. The regions 500a to 500d each include two parking lots 400. In this example, the first region 500a and the fourth region 500d each include one parking lot 400 having a relatively high demand for the shared vehicles 200 and a parking lot 400 having a relatively low demand for the shared vehicles 200. Further, the second region 500b includes two parking lots 400 having a relatively high demand for the shared vehicles 200. The third region 500c includes two parking lots 400 with a relatively low demand for the shared vehicles 200. In this case, the center 100 schedules and adds a new parking lot 400 in the second region 500b where the parking lots 400 having a relatively high demand for the shared vehicles 200 are concentrated. In addition, the center 100 schedules and cancels a parking lot 400 in the third region 500c where the parking lots 400 having a relatively low demand for the shared vehicles 200 are concentrated.

As described above, the above embodiment has the advantages described below.

(1) The demand for the shared vehicles 200 and the supply of the shared vehicles 200 in each parking lot are obtained to set the zones so that the balance of supply and demand for the shared vehicles 200 in each zone in an area is optimized. Then, the center 100 prompts a user to select a set zone including a parking lot where the user will start use of the shared vehicle 200 or end use of the shared vehicle 200. That is, the user selects a zone that includes a parking lot where the user will start use of the shared vehicle 200 or end use of the shared vehicle 200. Accordingly, the shared vehicles 200 are arranged in the parking lots in accordance with actual use of the shared vehicles 200. This improves user convenience and evenly distributes the shared vehicles 200. Additionally, the shared vehicles 200 are distributed more evenly as a result of usage of the shared vehicles 200. This eliminates the need for delivering the shared vehicles 200 to solve uneven distribution of the shared vehicles 200. This reduces the business cost of this service.

(2) The zones are set to optimize the balance of supply and demand for the shared vehicles 200 based on the predicted demand for the shared vehicles 200 in each parking lot. This allows for the shared vehicles 200 to be reserved in a manner reducing uneven distribution between the zones.

(3) A user selects a zone that includes a parking lot where the user will start use of the shared vehicle 200 or end use of the shared vehicle 200. The size of the zone is limited so that the user can arrive at the desired parking lot within a limited time after the user enters the zone. This improves user convenience.

(4) Input information that is used to search for a zone, such as a keyword corresponding to the characteristics of a zone, is set to facilitate the zone selection and improve user convenience.

(5) The schedule for adding and canceling a parking lot is managed in accordance with the use status of the shared vehicles 200 in each parking lot included in a zone. This reduces uneven distribution of the shared vehicles 200 between the parking lots in the zone.

It should be apparent to those skilled in the art that the present invention may be embodied in many other specific forms without technically contradicting each other or departing from the spirit or scope of the invention. Particularly, it should be understood that the present invention may be embodied in the following forms.

The above embodiment may be modified as described below.

In the above embodiment, the center 100 divides the zone 500 into the regions 500*a* to 500*d* and manages the schedule for adding and canceling parking lots located in the regions 500*a* to 500*d* based on the demand for the shared vehicles 200 at each parking lot. However, the center 100 does not necessarily have to divide the zone 500 into the regions 500*a* to 500*d*. For example, when a parking lot has demand for the shared vehicles 200 that is greater than or equal to an upper limit threshold, the center 100 may schedule the addition of a new parking lot near the existing parking lot. Further, when a parking lot has a demand for the shared vehicles 200 that is less than a lower limit threshold, the center 100 may schedule the cancellation of the parking lot.

In the above embodiment, the center 100 sets the input information used to search the zones 500 with the mobile information terminal 300 based on the characteristics information associated with the parking lots included in each zone 500. Instead, for example, the center 100 may be configured to present candidate zones 500 suggested to a user based on a selection history of the user, and the user manually selects the desired zone 500 from the suggested candidates.

In the above embodiment, the center 100 sets the parking lots to be included in each zone 500 while limiting the size of the zones 500 in an area. Instead, in addition to the size of the zones 500, the center 100 may set limitation conditions such as an upper limit of the number of parking lots included in each zone 500, or an upper limit of density of the parking lots located in each zone 500. Further, the center 100 may be configured to set the combination of the parking lots included in each zone 500 without setting any limitation conditions to the zones 500.

In the above embodiment, the center 100 generates training data by associating the attribution information, which influences the use of the shared vehicles 200, with the use history of the shared vehicles 200 to predict the demand for the shared vehicles 200 through machine learning using the training data. However, the center 100 does not necessarily have to associate the attribution information with the use history of the shared vehicles 200 when predicting the demand for the shared vehicles 200. For example, the center 100 may predict a function that indicates a chorological change of the demand for the shared vehicles 200 based on chorological data of the use history (demand) of the shared vehicles 200 and predict the demand for the shared vehicles 200 using the predicted function.

In the above embodiment, the center 100 automatically selects a parking lot with the highest relative value of the supply to the demand for the shared vehicles 200 from the parking lots included in the zone 500 selected by the user as a parking lot where the user will start use of the shared vehicle 200. Further, the center 100 automatically selects a parking lot with the highest relative value of the demand to the supply of the shared vehicles 200 from the parking lots included in the zone 500 selected by the user as a parking lot where the user will end of using the shared vehicle 200. Instead, the center 100 may be configured to display costs of the use of the shared vehicle 200 that differ based on the demand for or the supply of the shared vehicles 200 at each parking lot included in the zone selected by the user on the mobile information terminal of the user. This allows the user to refer to the costs of the use and select a parking lot in the zone the user has selected. Accordingly, the supply and demand for the shared vehicles 200 in the zone are well-balanced. That is, the user may select any one of the parking lots included in the zone 500 in accordance with use conditions, or the center 100 may automatically select one parking lot from the parking lots included in the zone 500.

What is claimed is:

1. A shared vehicle management device for managing shared vehicles located in an area where a user is present, wherein the area includes multiple zones differing from one another, and each of the zones includes one or more parking lots, the shared vehicle management device comprising:
   a communication circuit that is configured to receive and transmit information between the shared management device and a terminal device associated with the user;
   a controller circuit that is configured to transmit, via the communication circuit, an instruction to the terminal device to prompt the user to select, via the terminal device, from the multiple zones, a zone that includes a parking lot where the user will start use of a shared vehicle or a parking lot where the user will return the shared vehicle;
   the communication circuit further configured to receive a transmission from the terminal device, the transmission including a designation of the zone that includes the parking lot where the user will start use of the shared vehicle or the parking lot where the user will return the shared vehicle;
   processing circuitry configured to:
      acquire data of starting points of use of the shared vehicles as use history of the shared vehicles;
      generate training data by associating attribution information, the attribution information influencing use of the shared vehicles, with the use history of the shared vehicles, and store the training data;
      calculate a demand for shared vehicles in each zone based on the use history of the shared vehicles;
      perform machine learning using the training data to predict the demand for the shared vehicles in each parking lot based on prediction data of the attribution information;
      calculate a supply of shared vehicles in each zone based on a number of shared vehicles parked in each parking lot; and
      determine the parking lots included in each zone so as to minimize a value obtained by adding differences between the demand for shared vehicles in each zone included in the area and the supply of shared vehicles in each zone included in the area.

2. The shared vehicle management device according to claim 1, wherein the processing circuitry is further configured to determine the parking lots included in each zone while setting a limitation on a size of each zone in the area.

3. The shared vehicle management device according to claim 1, wherein the processing circuitry is further configured to set input information used to search the zone based on characteristics information associated with each parking lot included in each zone.

4. The shared vehicle management device according to claim 1, wherein the processing circuitry is further configured to manage a schedule for adding and canceling a parking lot based on the demand for shared vehicles in each parking lot.

5. A method for managing shared vehicles that are located in an area where a user is present, wherein the area includes multiple zones differing from one another, and each of the zones includes one or more parking lots, the method comprising:
   transmitting, via a communication circuit, an instruction to a terminal device to prompt the user to select, via the terminal device, from the multiple zones, a zone that includes a parking lot where the user will start use of a shared vehicle or a parking lot where the user will return the shared vehicle;

receiving a transmission from the terminal device, the transmission including a designation of the zone that includes the parking lot where the user will start use of the shared vehicle or the parking lot where the user will return the shared vehicle;

acquiring data of starting points of use of the shared vehicles as use history of the shared vehicles;

generating training data by associating attribution information, the attribution information influencing use of the shared vehicles, with the use history of the shared vehicles, and storing the training data;

calculating a demand for shared vehicles in each zone based on the acquired use history of the shared vehicles;

performing machine learning using the training data to predict the demand for the shared vehicles in each parking lot based on prediction data of the attribution information;

calculating a supply of shared vehicles in each zone based on a number of shared vehicles parked in each parking lot; and determining the parking lots included in each zone so as to minimize a value obtained by adding differences between the demand for shared vehicles calculated for each zone included in the area and the supply of shared vehicles calculated for each zone included in the area.

6. A shared vehicle management device for managing shared vehicles located in an area where a user is present, wherein the area includes multiple zones differing from one another, and each of the zones includes one or more parking lots, the shared vehicle management device comprising:

processing circuitry configured to:

transmit, via a communication circuit, an instruction to a terminal device to prompt the user to select, via the terminal device, from the multiple zones, a zone that includes a parking lot where the user will start use of a shared vehicle or a parking lot where the user will return the shared vehicle, receive a transmission from the terminal device, the transmission including a designation of the zone that includes the parking lot where the user will start use of the shared vehicle or the parking lot where the user will return the shared vehicle, acquire data of starting points of use of the shared vehicles as use history of the shared vehicles, generate training data by associating attribution information, the attribution information influencing use of the shared vehicles, with the use history of the shared vehicles, and store the training data, calculate a demand for shared vehicles in each zone based on the acquired use history of the shared vehicles, perform machine learning using the training data to predict the demand for the shared vehicles in each parking lot based on prediction data of the attribution information, calculate a supply of shared vehicles in each zone based on a number of shared vehicles parked in each parking lot, and determine the parking lots included in each zone so as to minimize a value obtained by adding differences between the demand for shared vehicles calculated for each zone included in the area and the supply of shared vehicles calculated for each zone included in the area.

* * * * *